United States Patent Office 3,341,510
Patented Sept. 12, 1967

3,341,510
L - ALANYL - L - PHENYLALANYL-L-ISOLEUCYL-GLYCYL-L-LEUCYL-L-METHIONINAMIDE AND A PROTECTED DERIVATIVE THEREOF
Francesco Chillemi, Milan, Italy, assignor to Società Farmaceutici Italia, Milan, Italy, a corporation of Italy
No Drawing. Filed Oct. 1, 1962, Ser. No. 227,564
Claims priority, application Italy, Oct. 5, 1961, 17,983/61; Feb. 5, 1962, 2,161/62
2 Claims. (Cl. 260—112.5)

My invention relates to therapeutically useful polypeptides, processes for their preparation, and pharmaceutical compositions containing them. More particularly, my invention concerns a class of polypeptides having a high vasodilatory and hypotensive activity, and consisting of the undecapeptide L-pyroglutamyl-L-prolyl - L - seryl-L-lysyl-L-aspartyl-L - alanyl - L - phenylalanyl-L-isoleucyl-glycyl-L-leucyl-L-methioninamide (I), the undecapeptide L-glutaminyl-L-prolyl-L - seryl - L - lysyl - L - aspartyl-L-ananyl-L-phenylalanyl-L-isoleucyl - glycyl - L - leucyl-L-methioninamide (II) and derivatives thereof (III), the tetrapeptide L-glutaminyl-L-prolyl-L-seryl-L-lysine (IV) and derivatives thereof (V), the heptapeptide L-aspartyl-L-glutaminyl-L-prolyl-L-seryl - L - lysyl - L - aspartyl-L-methioninamide (VI) and derivatives thereof (VII), the hexapeptide L-alanyl-L-phenylalanyl-L-isoleucyl-glycyl-L-leucyl-L-methioninamide (VIII) and derivatives thereof (IX), their pharmaceutical compositions and the process for their preparation.

The invention provides as new compounds all polypeptides containing the following grouping:

R-L-alanyl-L-phenylalanyl-L-isoleucyl-glycyl - L - leucyl-L-methioninamide wherein R is selected from the group consisting of—
    hydrogen,
    L-aspartyl,
    L-glutaminyl-L-prolyl-L-seryl-L-lysyl-L-aspartyl, and
    L-pyroglutamyl-L-prolyl-L-seryl-L-lysyl-L-aspartyl, their salts and esters and protected derivatives. Those polypeptides which are not themselves physiologically active are useful as intermediates in the preparation of physiologically active polypeptides.

The formulae of some of the above polypeptides are as follows:

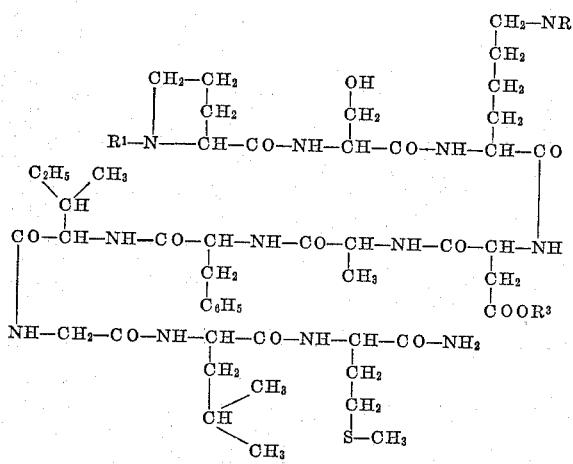

(I)  $R^1=CO-CH_2$ ; $R^2=H_2$; $R^3=H$

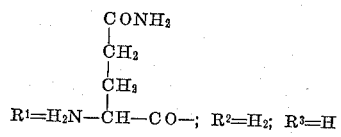

(II)  $R^1=H_2N-CH-CO-$; $R^2=H_2$; $R^3=H$

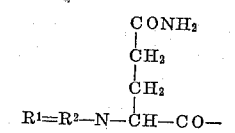

(III)  $R^1=R^2-N-CH-CO-$ $R^2$ = a protective group for an amino-group; $R^3$ = H or a protective group for a carboxy-group.

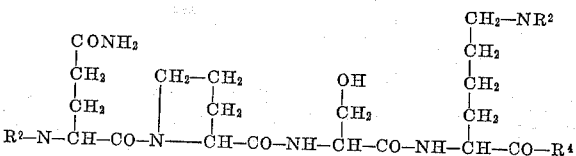

(IV)  $R^2=H_2$; $R^4=OH$ (V) $R^2$ = a protective group for an amino-group; $R^4$ = OH or a group able to react with an amino-group

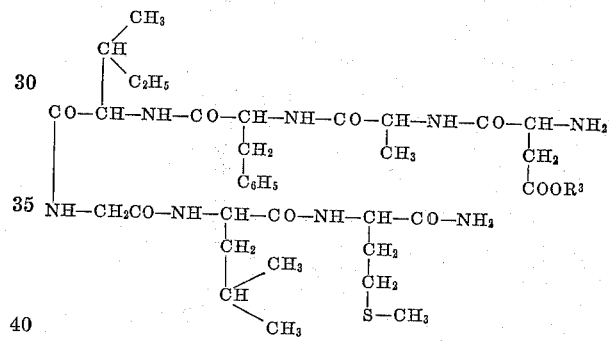

(VI)  $R^3=H$ (VII) $R^3$ = a protective group for a carboxy-group

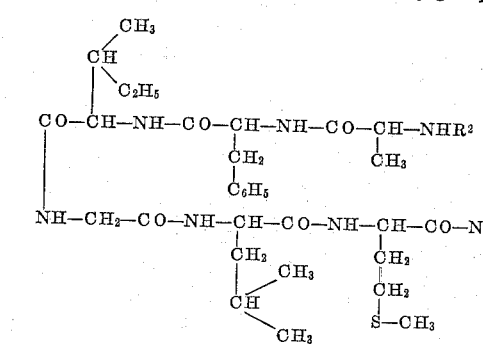

(VIII)  $R^2=H$ (IX) $R^2$ = a protective group for an amino-group

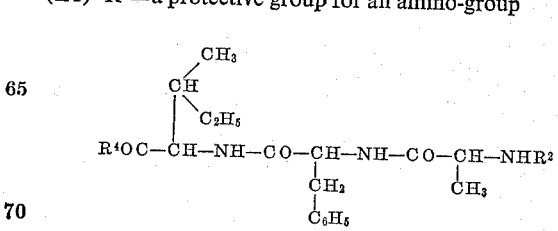

X) $R^2$ = protective group for an amino-group; $R^4$ = —OH or a protective group for a carboxy-group

XI)            $R^3$ = H; $R^2$ = —OH

XII)

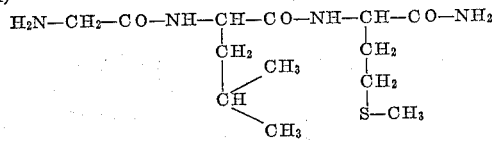

The undecapeptides I and II and the hexapeptide VIII have a high peripheral vasodilatory power particularly in dogs and in man, so that their use may be recommended in the clinic in the attacks of hypertensive patients. The polypeptides III, IV, V, VI, VII, IX are useful as intermediates and some of them for their hypotensive and vasodilatory activity.

The process of the invention includes condensing suitably protected derivatives of the peptide and polypeptide units which make up the polypeptides of the invention, and removing the protective groups as appropriate.

A preferred method of operation is as hereinbelow:

A derivative (X) of the new tripeptide L-alanyl-L-phenylalanyl-L-isoleucine (XI) having a protective group for an amino-group is condensed with the new tripeptide glycyl-L-leucyl-L-methioninamide (XII) to obtain the hexapeptide IX, from which by removing the protective group of the amino-group, the hexapeptide L-alanyl-L-phenylalanyl - L - isoleucylglycyl - L - leucyl - L - methioninamide (VIII) is obtained. The hexapeptide VIII is then reacted with a derivative of aspartic acid having a protective group for an amino-group and for a β-carboxyl-group to yield the heptapeptide VII, which after removing the protective groups, is transformed into the heptapeptide VI.

The derivative of the new tetrapeptide L-glutaminyl-L-prolyl-L-seryl-L-lysine (V) having the amino-groups protected, is condensed with the heptapeptide VII to yield the undecapeptide III, which, by elimination of the protective group, is converted into the undecapeptide II, and therefrom the undecapeptide I is obtained by elimination of ammonia.

The new tetrapeptide L-glutaminyl-L-prolyl-L-seryl-L-lysine (IV) is obtained by reaction of L-glutaminyl-L-proline, having the amino-group protected, with the L-seryl-L-lysine, having the ε-amino-group as well as the carboxyl-group of lysine protected, and by eliminating the protective groups of the resulting tetrapeptide. For the protection of amino-groups (substituent $R^2$), there can be used, for example, the tosyl-, carbobenzoxy-, carbo-t-butoxy, trifluoroacetyl- or trityl-groups usually employed in polypeptide chemistry. For the protection of the carboxy group (substituent $R^3$), there can be employed, for example, the methyl, ethyl, t-butyl, benzyl, p-nitrobenzyl groups which are usually employed for this purpose.

The acid derivatives able to react with the amino-groups are: chloride, azide, p-nitrophenylester, and others usually employed for this kind of reaction, or the acid may be reacted in presence of dicyclohexylcarbodiimide.

The removal of the protective groups may be performed according to the processes known in the literature, such as treatment either with alkali hydroxide or with sodium in liquid ammonia or with hydrochloric or hydrobromic acid or by catalytic hydrogenation, as appropriate in each case.

Both the separation and the purification of the polypeptides of the present invention, in particular of the undecapeptides, are also performed according to well known techniques of chromatography either over basic alumina or ion exchange resins or by the countercurrent distribution. In particular the process of the present invention is preferably carried out as follows:

Tosyl-L-pyroglutamyl-chloride is condensed with proline and the dipeptide obtained is converted into tosyl-L-glutaminyl-L-proline by reaction with concentrated ammonia. The dipeptide is further condensed with L-seryl-(ε-N-tosyl)-L-lysine ethyl ester hydrochloride (obtained by condensing the carbobenzoxy-L-seryl-azide with ε-N-tosyl-L-lysine ethyl ester and further by eliminating the carbobenzoxy-group), to yield N-tosyl-L-glutaminyl-L-prolyl-L-seryl-(ε-N-tosyl)-L-lysine ethyl ester (Formula V, where $R^2$=tosyl; $R^4$=O-ethyl) from which by removing the ethyl-group, the tetrapeptide V ($R^2$=tosyl; $R^4$=OH) is obtained. By elimination of the tosyl groups, the tetrapeptide IV is obtained.

The tetrapeptide IV also can be obtained in good yields by condensing the N-carbobenzoxy-L-glutaminyl-L-proline (obtained by reaction of L-proline with N-carbobenzoxy-L-pyroglutamyl-chloride and further reaction with ammonia) with the L - seryl - ε - N - carbobenzoxy - L - lysine methyl ester (obtained by reaction of N-trityl-L-serine with the ε-N-carbobenzoxy-L-lysine and further hydrolysis with aqueous acetic acid) and the subsequent elimination of the protective groups.

The L-phenylalanyl-L-isoleucyl methyl ester hydrochloride (prepared by condensing the carbobenzoxy-L-phenylalanine with L-isoleucyl methyl ester and further eliminating the carbobenzoxy-group from the dipeptide obtained) is condensed with carbobenzoxy-L-alanine to yield the carbobenzoxy - L - alanyl - L - phenylalanyl - L - isoleucine methyl ester, which by elimination of the methyl group is converted into the carbobenzoxy-L-alanyl-L-phenylalanyl-L-isoleucine (X). This tripeptide is condensed with the glycyl-L-leucyl-L-methioninamide (XII) (obtained by condensing the carbobenzoxy-glycyl-L-leucine with methionine methyl ester and by reacting the tripeptide obtained with a saturated solution of ammonia in methanol to yield the carbobenzoxy-glycyl-L-leucyl-L-methioninamide, from which the carbobenzoxy-group is removed), to obtain the carbobenzoxy-L-alanyl-L-phenylalanyl - L - isoleucyl - glycyl - L - leucyl - L - methioninamide (IX), from which by removing the carbobenzoxy-group, the hexapeptide VIII is produced.

The hexapeptide VIII, being reacted with benzyl carbobenzoxy-β-aspartate yields the corresponding heptapeptide, from which by removing the carbobenzoxy-group, the β - benzyl - L - aspartyl - L - alanyl - L - phenylalanyl - L - isoleucyl - glycyl - L - leucyl - L - methioninamide (VIII) is obtained. The heptapeptide VI is obtained by removing the benzyl-group.

By condensing the heptapeptide VII with tetrapeptide V, the undecapeptide III is obtained. For example, by condensing the β - benzyl-L-aspartyl-L-alanyl-L-phenylalanyl-L-isoleucyl-glycyl-L-leucyl-L - methioninamide with the N-tosyl-L-glutaminyl-L-prolyl-L-seryl - (ε - N - tosyl) - L-lysine, the undecapeptide N - tosyl - L - glutaminyl - L - prolyl - L - seryl - (ε-N-tosyl) - L-lysyl - (β-benzyl)-L-aspartyl - L - alanyl-L-phenylalanyl-L-isoleucyl - glycyl-L-leucyl-L - methioninamide (III) is obtained. Another route is the condensation of the N - carbobenzoxy - L-glutaminyl-L-prolyl - L - seryl-ε-N-carbobenzoxy-L-lysine azide with L-aspartyl - L - alanyl-L-phenylalanyl-L-isoleucyl-glycyl-L-leucyl - L - methioninamide to yield the N-carbobenzoxy-L-glutaminyl - L - prolyl-L-seryl - ε-N-carbobenzoxy - L - lysyl-L-aspartyl-L-alanyl - L - phenylalanyl - L - isoleucyl-glycyl - L - leucyl-L-methioninamide (III).

The undecapeptide II is obtained by removing the protective groups of III.

By submitting the undecapeptide II to a medium promoting the ammonia-displacement, for example by chromatography over carboxylic exchange resins or by heating with water, the undecapeptide I is obtained.

The polypeptides of the invention, in particular the polypeptides I, II and VIII, have a strong peripheral vasodilatory action, which is well noticeable mainly in dog and in man. Active doses for dog are 0.001–0.005γ/kg. of pure polypeptide when administered intravenously. Injection into the phemoral arteria produces vasodilations in dog's limbs up to doses of 0.001γ. On smooth isolated intestinal muscles of rabbit, dog and Guinea pig, the hexapeptide is active up to doses of 0.001–0.002γ.

The polypeptides of the invention, per se, or salified by an inorganic or organic non-toxic acid such as hydrochloric acid, hydrobromic acid, sulfuric acid, phosphoric acid, acetic acid, propionic acid, valeric acid, succinic acid, trifluoroacetic acid, etc., are practically and usefully clinically employed for the hypertensive attacks of patients, or anyhow in the emergency therapy of very serious hypertension; in the vascular spastic syndromes, especially in muscle-cutaneous sections (particularly in cases of Burger's disease, Raynaud's disease, torpid ulcers) of the retinal vessels (amaurosis from spasm of the retina central action) of meningeal vessels (cephalea and hemicrania from vasospasm) and of the coronary vessels (angina attacks).

Said polypeptides can be administered parenterally: subcutaneously, intramuscularly, intravenously (a single injection or slow dripping) or intraarterially. The most suitable solvents are water or non-alkaline physiological saline solutions.

By the subcutaneous or intramuscular route, they can be added to substances retarding absorption. The active ingredient percentages may vary according to the particular pharmaceutical forms and according to the desired hypotensive effect, but generally they are very low. The daily administration of the active ingredient may vary from 0.005 to 5 mg. in human beings. Neither acute nor chronic toxicity manifestations have been found to result from these uses of the polypeptides of the invention.

The following examples serve to illustrate, but are not intended to limit, the invention:

EXAMPLE 1

*Tosyl-L-pyroglutamyl-L-proline*

5.04 g. of L-proline were dissolved in 40 cc. of water, 4 g. of magnesium oxide were added and the mixture was cooled with an ice-salt mixture. 12 g. of tosyl-L-pyroglutamyl chloride (Coll. Zech. Chem. Comm., 1954, 19, 365) were added during 20 minutes with a strong stirring. The reaction mixture was stirred at room temperature for an additional 1.5 hours and then acidified with concentrated hydrochloric acid. The precipitate was allowed to decant for 30 minutes and then filtered.

Yield: 10.5 g.; M.P.=250–252° C. (recrystallized from ethanol); $[\alpha]_D^{30} = -80°$ (c.=0.5 in ethanol).

EXAMPLE 2

*Tosyl-L-glutaminyl-L-proline*

8 g. of tosyl-L-pyroglutamyl-L-proline, prepared as described in Example 1, were dissolved in 40 cc. of concentrated ammonia and the solution was allowed to stand for 60 minutes. Most of the ammonia was removed in vacuo and the remaining solution was acidified with hydrochloric acid. The product was recrystallized from ethanol-water.

Yield: 7.6 g.; M.P.=216–218° C.; $[\alpha]_D^{25} = -18°$ (c.=1 in ethanol).

EXAMPLE 3

*Carbobenzoxy-L-seryl-(ε-N-tosyl)-L-lysine ethyl ester*

A solution of carbobenzoxy-L-seryl-azide in ethyl acetate prepared from 5.06 g. of carbobenzoxy-L-seryl-hydrazide (J. Biol. Chem., 1942, 146, 463) was added to solution of ε-N-tosyl-L-lysine ethyl ester in ethyl acetate (J. Amer. Chem. Soc., 1956, 78, 5886), prepared from 8.6 g. of the hydrochloride. After 24 hours at room temperature, the reaction mixture was extracted with 1 N hydrochloric acid, 1 M sodium bicarbonate, water, and dried over anhydrous sodium sulfate. The solvent was evaporated in vacuo, yielding 8 g. of an oily residue.

EXAMPLE 4

*L-seryl-(ε-N-tosyl)-L-lysine ethyl ester hydrochloride*

8 g. of carbobenzoxy-L-seryl-(ε-tosyl)-L-lysine ethyl ester, prepared as in Example 3, were dissolved in 100 cc. of ethanol, and to the solution 2.5 g. of 10% palladium over charcoal were added. The mixture was then hydrogenated for 4 hours at atmospheric pressure. After filtering off the catalyst, the solution was concentrated to a small volume, 200 cc. of anhydrous ether were added and the solution was acidified with gaseous hydrochloric acid. The solvent was decanted, the residue repeatedly triturated with anhydrous ether, and dried in vacuo.

Yield: 6.6 g.; M.P.=65–67° C. (with decomposition); $[\alpha]_D^{25} = -7.5°$ (c.=3 in ethanol).

EXAMPLE 5

*N - tosyl - L-glutaminyl-L-prolyl-L-seryl-(ε-N-tosyl)-L-lysine ethyl ester (V: R$^2$=tosyl; R$^4$=O-ethyl)*

6.4 g. of L-seryl-(ε-N-tosyl)-L-lysine ethyl ester hydrochloride, prepared as in Example 4, were dissolved in 80 cc. of acetonitrile and 2.1 cc. of triethylamine were added. Then 4.7 g. of tosyl-L-glutaminyl-L-proline, prepared as in Example 2, dissolved in 40 cc. of dimethylformamide and 3.5 g. of dicyclohexylcarbodiimide were added and the mixture was stirred for 24 hours at room temperature. The dicyclohexylurea was filtered off, the solvent evaporated off in vacuo, the residue triturated several times with petroleum ether, dissolved in 100 cc. of ethyl acetate and the solution extracted with 1 N hydrochloric acid, 1 M sodium bicarbonate and water. After drying of the solution over sodium sulfate, the solvent was removed in vacuo to yield 5.6 g. of viscous residue.

EXAMPLE 6

*N - tosyl - L-glutaminyl-L-prolyl-L-seryl-(ε-N-tosyl)-L-lysine (V: R$^2$=tosyl; R$^4$=OH)*

4.7 g. of N-tosyl-L-glutaminyl-L-prolyl-L-seryl-(ε-N-tosyl)-L-lysine ethyl ester, prepared as in Example 5, were dissolved in 15 cc. of methanol. Thereafter, 9 cc. of 2 N sodium hydroxide were added. The solution was left for 30 minutes at room temperature. The methanol was evaporated off in vacuo at room temperature and the residue diluted with water and acidified. The precipitate was dissolved in ethyl alcohol and ethyl acetate and the solution dried over anhydrous sodium sulfate. After removal of the solvent, 4 g. of the substance in the form of foam were obtained.

$[\alpha]_D^{26} = -22.4°$ (c.=5 in ethanol). By removal of the tosyl protective groups, the tetrapeptide IV was obtained.

EXAMPLE 7

*Carbobenzoxy-L-phenylalanyl-L-isoleucine methyl ester*

29.9 g. of carbobenzoxy-L-phenylalanine (Ber., 1958, 91, 462) and 16 g. of L-isoleucine methyl ester (Helv. Chim. Acta., 1955, 38, 1500) were dissolved in 250 cc. of anhydrous tetrahydrofuran. Then 24.7 g. of dicyclohexylcarbodiimide were added with stirring and cooling. The mixture was stirred for 16 hours at room temperature. After filtration to remove the dicyclohexylurea, the solvent was evaporated off in vacuo, the residue dissolved in 500 cc. of ethyl acetate and extracted with 1 N hydrochloric acid, 1 M sodium bicarbonate and finally with water. The solution was dried over anhydrous sodium sulfate and then the solvent was evaporated. The residue was recrystallized from ethyl acetate-petroleum ether.

Yield: 36 g.; M.P.=106–107° C.; $[\alpha]_D^{30} = -10.5$ (c.=2 in ethanol).

EXAMPLE 8

*L-phenylalanyl-L-isoleucine methyl ester hydrochloride*

21.3 g. of carbobenzoxy-L-phenylalanyl-L-isoleucine methyl ester, prepared as in Example 7, were dissolved a 250 cc. of methanol, and 8 g. of 10% palladium on charcoal were added to the solution. The mixture was hydrogenated for 5 hours at atmospheric pressure. After filtering off the catalyst, the solvent was evaporated off, the residue dissolved in anhydrous ether and the solution thus obtained was acidified with gaseous hydrochloric acid and evaporated to dryness.

Yield: 15 g.; M.P.=74–76° C.; $[\alpha]_D^{28}$=+6.25 (c.=2 in ethanol).

EXAMPLE 9

Carbobenzoxy - L - alanyl-L-phenylalanyl-L-isoleucine methyl ester (X: $R^2$=carbobenzoxy; $R^4$=O-methyl)

1.1 g. of carbonobenzoxy-L-alanine (J. Biol. Chem., 1938, 124, 702) and 15 g. of L-phenylalanyl-L-isoleucine methyl ester (as free base), prepared as in Example 8, were dissolved in 150 cc. of tetrahydrofuran and 12.3 g. of dicyclohexylcarbodiimide were added with cooling and stirring. The mixture was allowed to stand for 16 hours at room temperature and was then filtered, the solvent evaporated off and the residue dissolved in 400 cc. of ethyl acetate. The solution was shaken with 1 N hydrochloric acid, 1 M sodium bicarbonate and water. The solution was dried over sodium sulfate, the solvent evaporated off and the residue recrystallized from ethyl acetate-petroleum ether.

Yield: 21 g.; M.P.=154–156° C.; $[\alpha]_D^{28}$=−44.6° (c.=2.5 in ethanol).

EXAMPLE 10

Carbobenzoxy - L - alanyl-L-phenylalanyl-L-isoleucine (V: $R^2$=carbobenzoxy; $R^4$=OH)

4.9 g. of carbobenzoxy-L-alanyl-L-phenylalanyl-L-isoleucine methyl ester, prepared as in Example 9, were dissolved in 90 cc. of ethanol after which 20 cc. of 1 N sodium hydroxide were added. After 90 minutes at 20° C., the ethanol was evaporated off in vacuo at room temperature, the residue again taken up with water, the resulting solution acidified with hydrochloric acid and the precipitate extracted with ethyl acetate. After drying over sodium sulfate, the solvent was evaporated.

Yield: 4.4 g.; M.P.=183–186° C. (recrystallized from ethyl acetate).

EXAMPLE 11

Carbobenzoxy - glycyl - L - leucyl-L-methionine methyl ester 10 g. of carbobenzoxy-glycyl-L-leucine (J. Amer. Chem. Soc., 1956, 78, 2130) and 5 g. of methionine methyl ester (Helv. Chem. Acta., 1951, 34, 2091) were dissolved in 90 cc. of tetrahydrofuran. Then 7.2 g. of dicyclohexylcarbodiimide were added and the mixture was stirred for 16 hours at room temperature. The dicyclohexylurea was filtered off, the solvent was evaporated off in vacuo and the residue was dissolved in 250 cc. of ethyl acetate. The solution was extracted with 1 N hydrochloric acid, 1 M sodium bicarbonate and water. After drying over sodium sulfate, the solution was evaporated in vacuo. The oily residue was triturated with petroleum ether to yield a crystalline product, which was purified by recrystallization from ethyl acetate-petroleum ether.

Yield: 12 g.; M.P.=118–119° C.; $[\alpha]_D^{30}$=−43.1° (c.=3 in ethanol).

EXAMPLE 12

Carbobenzoxy-glycyl-L-leucyl-L-methioninamide 10 g. of carbobenzoxy-glycyl-L-leucyl-L-methioninamide methyl ester, prepared as in Example 11, were dissolved in 200 cc. of anhydrous methanol saturated with ammonia at 0° C. After 4 days at room temperature, the solution was evaporated to dryness, the residue repeatedly triturated with ethyl acetate and dried.

Yield: 8 g.; M.P.=177–179° C. (recrystallized from ethyl acetate [$\alpha]_D^{30}$=−37.5° (c.=5 in methanol).

EXAMPLE 13

Glycyl-L-leucyl-L-methioninamide (XII)

5.5 g. of carbobenzoxy-glycyl-L-leucyl - L - methioninamide, prepared as in Example 12, dissolved in 250 cc. of methanol were added to 3 g. of 10% palladium on charcoal and hydrogenated at atmospheric pressure. After 3 hours a further 3 g. of catalyst was added and the mixture was reacted again for 4 hours. After filtering off the catalyst, the solution was evaporated to dryness, the residue triturated with water and the filtrate evaporated in vacuo.

Yield of crude product: 2 g.; M.P.=120° C.

EXAMPLE 14

Carbobenzoxy-L-alanyl-L-phenylalanyl-L-isoleucyl-glycyl-L-leucyl-L-methioninamide (IX: $R^2$=carbobenzoxy)

2.7 g. of carbobenzoxy-L-alanyl-L-phenylalanyl - L-isoleucine, prepared as in Example 10, and 1.8 g. of glycyl-L-leucyl-L-methioninamide, prepared as in Example 13, were dissolved in 50 cc. of dimethylformamide, then 1.4 g. of dicyclohexylcarbodiimide were added and the mixture was stirred for 20 hours at room temperature. After filtration to remove 1.5 g. of dicyclohexylurea, the solution was evaporated to dryness in vacuo and the residue was triturated with anhydrous ether, the precipitate was again dissolved in the minimum quantity of dimethylformamide and again precipitated with ether.

Yield: 3 g.; M.P.=235–238° C. (recrystallized from ethanol).

EXAMPLE 15

L-alanyl-L-phenylalanyl-L-isoleucyl-glycyl-L-leucyl-methioninamide hydrobromide (VIII)

To 1.4 cc. of a saturated solution of hydrobromic acid in acetic acid were added 1.1 cc. of diethylphosphite and 0.5 cc. of acetic acid. Into this mixture, 0.4 g. of carbobenzoxy-L-alanyl-L-phenylalanyl - L - isoleucyl-glycyl-L-leucyl-L-methioninamide, prepared as in Example 14, were dissolved. After 75 minutes at 20° C. 50 cc. of anhydrous ether were added to the solution. The resulting precipitate was repeatedly washed with ether and dried in vacuo over potassium hydroxide and phosphoric anhydride.

Yield: 0.36 g.; M.P.=250–255° C. (dec.);

$$[\alpha]_D^{20}=-20\pm4°$$

(c.=1 in acetic acid).

EXAMPLE 16

N-carbobenzoxy - (β-benzyl) - L - aspartyl-L-alanyl-L-phenylalanyl-L-isoleucyl - glycyl - L - leucyl - L-methioninamide 0.36 g. of L-alanyl-L-phenylalanyl-L-isoleucyl-glycyl-L-leucyl-L-methioninamide hydrobromide, prepared as in Example 15, were dissolved in 7 cc. of dimethylformamide and the solution was reacted with 0.071 cc. of triethylamine. Then 0.178 g. of benzyl-carbobenzoxy-β-aspartate (J. Chem. Soc., 1959, 3870) and 0.123 g. of dicyclohexylcarbodiimide were added. After 2 days at room temperature, the solution was filtered, concentrated to a small volume and the heptapeptide precipitated with ether.

Yield: 0.5 g.

EXAMPLE 17

β-benzyl - L - aspartyl - L - alanyl-L-phenylalanyl-L-isoleucyl-glycyl - L - leucyl - L - methioninamide hydrobromide (VII: $R^3$=benzyl)

0.5 g. of N - carbobenzoxy - (β-benzyl)-L-aspartyl-L-alanyl-L-phenyl-alanyl-L-isoleucyl - glycyl - L - leucyl-L-methioninamide, prepared as in Example 16, were dissolved in a mixture of 2.8 cc. of acetic acid and 1.2 cc. of diethylphosphite saturated with gaseous hydrogen bromide. After 15 minutes, 100 cc. of anhydrous ether were added, the precipitate was repeatedly washed with ether and finally dried in vacuo over potassium hydroxide and phosphoric anhydride.

Yield: 0.42 g. by removal of the protective benzyl group, the heptapeptide VI was obtained.

EXAMPLE 18

N-tosyl - L - glutaminyl - L - prolyl-L-seryl-(ε-N-tosyl)-L-lysyl-(β-benzyl)-L-aspartyl - L - alanyl - L - phenylalanyl-L-isoleucyl - glycyl - L - leucyl - L - methioninamide (III: $R^2$=tosyl; $R^3$=benzyl)

0.42 g. of β-benzyl - L - aspartyl-L-alanyl-L-phenylalanyl-L-isoleucyl - L - leucyl-L-methioninamide hydrobromide, prepared as in Example 17, were dissolved in 4 cc. of dimethylformamide and treated with 0.063 cc. of triethylamine. To this solution, 0.35 g. of N-tosyl-L-glutaminyl-L-prolyl-L-seryl-(ε-N-tosyl) - L - lysine, prepared as in Example 6, and 0.11 g. of dicyclohexylcarbodiimide were added. The reaction mixture was left at room temperature for 2 days. After filtering off the dicyclohexylurea, the solution was concentrated to a small volume and the protected peptide was precipitated by addition of ether.

Yield: 0.68 g.

EXAMPLE 19

L-glutaminyl - L - prolyl - L - seryl-L-lysyl-L-aspartyl-L-alanyl-L-phenylalanyl - L - isoleucyl - glycyl-L-leucyl-L-methioninamide (II)

0.68 g. of the protected undecapeptide, prepared as in Example 18, were dissolved in 20 cc. of liquid ammonia, then 0.13 g. of metallic sodium were added under stirring. To the reaction mixture, 0.45 cc. of acetic acid were added. After evaporation of the ammonia, the residue was dried in vacuo over phosphoric anhydride.

Yield: 0.6 g.

The polypeptide II may alternatively be obtained from the polypeptide III where $R^2$ may for example be carbobenzoxy or carbo-t-butoxy and $R^3$ may for example be p-nitrobenzyl or t-butyl.

EXAMPLE 20

L-pyroglutamyl - L - prolyl - L - seryl-L-lysyl-L-aspartyl-L-alanyl-L-phenylalanyl - L - isoleucyl - glycyl-L-leucyl-L-methioninamide (I)

The undecapeptide II was dissolved in water and passed through an anion exchange resin column, such as Amberlite IRC 50, and eluted with water. After purification in known manner, of the undecapeptide obtained, the undecapeptide I in pure form was obtained.

EXAMPLE 21

N-carbobenzoxy-L-pyroglutamyl-L-proline 2.5 g. of L-proline were dissolved in 40 cc. of water and ice-cooled. 2 g. of magnesium oxide and 5.6 g. of N-carbobenzoxy-L-pyroglutamyl-chloride (Annalen, 1961, 640, 151) finely reduced to powder were added. The mixture was stirred for an hour at 0° C. and for another hour at 20° C. After acidifying with hydrochloric acid, the precipitate was filtered, washed with water and recrystallized from water-alcohol.

Yield: 5 g.; M.P.=177–178° C.; $[\alpha]_D^{22}$=—84° (c.=2 in ethanol); $[\alpha]_D^{24}$=106° (c.=2 in acetic acid 95%).

EXAMPLE 22

N-carbobenzoxy-L-glutaminyl-L-proline 4.8 g. of N-carbobenzoxy-L-pyroglutamyl-L-proline, prepared as in Example 21, were dissolved in 30 cc. of concentrated aqueous ammonia and the solution was allowed to stand overnight. The majority of the ammonia was removed in vacuo and the remaining solution was acidified with hydrochloric acid. The separated oil was extracted with ethyl acetate and after drying over sodium sulfate, the solvent was evaporated in vacuo. The residue was triturated with petroleum-ether and dried over phosphorus pentoxide.

Yield: 4.5 g. of amorphous product. $[\alpha]_D^{20}$=—45° (c.=4 in ethanol).

EXAMPLE 23

N-trityl-L-serine methyl ester 15.5 g. of L-serine methyl ester hydrochloride (Helv. Chim. Acta, 1958, 41, 1858) were dissolved in 150 cc. anhydrous chloroform and to this ice-cooled solution 28 cc. of triethylamine and 27.8 g. of trityl chloride were added under stirring. After six hours at room temperature the solution was washed three times with water and dried over sodium sulfate. The solvent was evaporated off in vacuo and the residue recrystallized from benzene/petroleum ether.

Yield: 29 g.; M.P.=145° C.

EXAMPLE 24

N-trityl-L-serine 25 g. of N-trityl-L-serine methyl ester, prepared as in Example 23, were dissolved in a hot mixture of 40 cc. of ethanol and 80 cc. of alcoholic 1 N potassium hydroxide. After 1 hour at room temperature, the solution was diluted with 250 cc. of water, ice-cooled and acidified with acetic acid. The precipitate was filtered, washed and recrystallized from methylethylketone/petroleum ether.

Yield: 15 g.; M.P.=154–157° C.; $[\alpha]_D^{24}$=+24° (c.=3 in ethanol).

EXAMPLE 25

N-trityl-L-seryl-ε-N-carbobenzoxy-L-lysine methyl ester 13.1 g. of ε-N-carbobenzoxy-L-lysine methyl ester hydrochloride (Helv. Chim. Acta, 1958, 41, 1878) were dissolved in 100 cc. of dimethylformamide and 100 cc. of acetonitrile. Then 5.6 cc. of triethylamine, 13.2 g. of N-trityl-L-serine, prepared as in Example 24, and, on cooling, 8.4 g. of dicyclohexylcarbodiimide were added. After 20 hours at room temperature, the dicyclohexylurea was filtered off, and the solvent was evaporated off in vacuo. The residue was dissolved in 350 cc. of ethyl acetate and the solution was washed with 1 N hydrochloric acid (at 0° C.), 1 M sodium bicarbonate and with water. After drying over sodium sulfate, ethylacetate was distilled off and the residue twice recrystallized from ethylacetate/petroleum-ether.

Yield: 15 g.; M.P.=128° C.; $[\alpha]_D^{23}$=—38° (c.=5 in ethanol).

EXAMPLE 26

L-seryl-ε-N-carbobenzoxy-L-lysine methyl ester 8.4 g. of N-trityl-L-seryl-ε-N-carbobenzoxy-L-lysine methyl ester, prepared as in Example 25, were dissolved in 50 cc. of acetic acid, then 50 cc. of water were added and the mixture was heated on a water bath for 30 minutes. A further 50 cc. of water were added to the reaction mixture and the whole was cooled to 0° C. After filtration, the clear solution was evaporated in vacuo to dryness. The residue was again taken up with 80 cc. of aqueous 2% ammonia and the mixture was extracted with chloroform. The extracts were dried over sodium sulfate and distilled off in vacuo to yield a syrupy residue.

Yield: 4.2 g. The product appears unitary on paper chromatography.

EXAMPLE 27

N-carbobenzoxy-L-glutaminyl-L-prolyl-L-seryl-ε-N-carbobenzoxy-L-lysine methyl ester (V: $R^2$=carbobenzoxy; $R^4$=O-methyl)

4.1 g. of N-carbobenzoxy-L-glutaminyl-L-proline, prepared as in Example 22, and 4.2 g. of L-seryl-ε-N-carbobenzoxy-L-lysine methyl ester, prepared as in Example 26, were dissolved in 70 cc. of methylene dichloride and to the solution, cooled to 0° C., 2.5 g. of dicyclohexylcarbodiimide were added. After 16 hours at 20° C., the mixture was filtered and the filtrate was washed with 1 N hydrochloric acid, 1 M sodium bicarbonate and water. The solution was dried over sodium sulfate, the solvent was distilled off in vacuo and the residue recrystallized from ethyl acetate/petroleum ether.

Yield: 5 g.; M.P.=58–60° C.; $[\alpha]_D^{25}=-50°$ (c.=2 in ethanol).

EXAMPLE 28

*N-carbobenzoxy-L-glutaminyl-L-prolyl-L-seryl-ε-N-carbobenzoxy - L - lysine hydrazide* (V: $R^2$=carbobenzoxy; $R^4$=—NH—NH$_2$)

3 g. of N-carbobenzoxy-L-glutaminyl-L-prolyl-L-seryl-ε-N-carbobenzoxy-L-lysine methyl ester, prepared as in Example 27, were dissolved in 30 cc. of methanol, and 7 cc. of hydrazine hydrate were added. The solution was kept overnight at 20° C., then it was evaporated to dryness in vacuo and the residue was repeatedly triturated with anhydrous ethyl ether. The product was recrystallized from ethanol.

Yield: 2 g.; M.P.=163–165° C.; $[\alpha]_D^{25}=-30°$ (c.=2 in dimethylformamide).

EXAMPLE 29

*N-trityl-glycyl-L-leucine methyl ester*

31.7 g. of N-trityl-glycine (J. Amer. Chem. Soc., 1956, 78, 1359) and 15.9 g. of L-leucine methyl ester (Helv. Chim. Acta, 1946, 29, 784) were dissolved in 300 cc. of tetrahydrofuran and 22.6 g. of dicyclohexylcarbodiimide were added. The mixture was stirred overnight at room temperature, then the dicyclohexylurea was filtered off and the solvent distilled off in vacuo. The residue was dissolved in 300 cc. of ethyl acetate, and the solution washed with 1 N hydrochloric acid (at 0° C.), 1 N ammonium hydroxide and water. After drying over sodium sulfate the solvent was removed in vacuo.

Yield: 35 g. of syrupy product.

EXAMPLE 30

*N-trityl-glycyl-L-leucine*

35 g. of N-trityl-glycyl-L-leucine methyl ester, prepared as in Example 29, were dissolved in 90 cc. of 1 N alcoholic potassium hydroxide and 50 cc. of ethanol by heating. The solution was kept at room temperature for 1.5 hours, then it was diluted with 300 cc. of water and filtered. The clear filtrate was cooled, acidified with acetic acid; the precipitate was filtered and washed with water.

Yield: 20 g.; M.P.=75°–85° C.

EXAMPLE 31

*L-methioninamide*

38.5 g. of L-methionine methyl ester (Helv. Chim. Acta, 1951, 34, 2091) were dissolved in 250 cc. of anhydrous methanol and the solution was saturated at 5° C. with gaseous ammonia. After four days at +5° C., the solution was evaporated to dryness in vacuo and the residue was several times triturated with anhydrous ethyl ether.

Yield: 33 g.; M.P.=50°–51° C.; $[\alpha]_D^{17}=-2.0$ (c.=5 in ethanol).

EXAMPLE 32

*N-trityl-glycyl-L-leucyl-L-methioninamide*

17.2 g. of N-trityl-glycyl-L-leucine, prepared as in Example 30, and 6.0 g. of L-methioninamide, prepared as in Example 31, were dissolved in 180 cc. of methylene dichloride; then 8.6 g. of dicyclohexylcarbodiimide were added with cooling. After one night at room temperature, the reaction mixture was filtered and the filtrate washed with 1 N hydrochloric acid at 0° C., 1 M sodium bicarbonate and water. After drying over sodium sulfate, the solvent was distilled off in vacuo and the residue recrystallized from ethyl acetate.

Yield: 15 g.; M.P.=214°–216° C.; $[\alpha]_D^{21}=-20°$ (c.=1.6 in ethanol).

EXAMPLE 33

*Glycyl-L-leucyl-L-methioninamide* (XII)

9.5 g. of N - trityl - glycyl-L-leucyl-L-methioninamide, prepared as in Example 32, were dissolved in 50 cc. of acetic acid, then 50 cc. of water were added and the mixture was heated for 30 minutes in a water bath. After addition of another 50 cc. of water, the mixture was cooled to 0° C. and the triphenylcarbinol was filtered off, the clear solution thus obtained was concentrated to dryness in vacuo. The residue of glycyl-L-leucyl-L-methioninamide acetate was recrystallized from ethanol; M.P.=134°–136° C.

An aqueous solution of this tripeptide acetate was passed over a column of ion exchange resin such as "Dowex 2" in basic form, and the eluate was concentrated to dryness in vacuo.

Yield: 4.6 g.; M.P.=156°–158° C.; $[\alpha]_D^{21}=-50°$ C. (c.=2 in water).

EXAMPLE 34

*N - carbobenzoxy - L - glutaminyl - L - propyl - L - seryl-ε - N - carbobenzoxy - L - lysyl - L - aspartyl - L - alanyl-L - phenylalanyl - L - isoleucyl - glycyl - L - leucyl - L-methioninamide* (III: $R^2$=carbobenzoxy; $R^3$=H)

0.60 g. of N-carbobenzoxy - L - glutaminyl-L-prolyl-L-seryl-ε-N-carbobenzoxy-L-lysine-hydrazide, prepared as in Example 28, were dissolved in 12 cc. of dimethylformamide, then 0.81 cc. of 4 N hydrochloric acid was added and the mixture was cooled to −5° C. After addition of 0.22 cc. of 4 N sodium nitrite, the solution was stirred at −5° C. for 5 minutes with 0.34 cc. of triethylamine and dried over sodium sulfate many times. The mixture was filtered and the sodium sulfate was washed with 5 cc. of dimethylformamide, 0.70 g. of L-aspartyl-L-alanyl-L-phenylalyanl-L-isoleucyl-glycyl-L-leucyl-L-methioninamide, prepared as described in Example 17, and 0.34 cc. of triethylamine were added to the filtrate. After 3 days at 5° C., the solvent was evaporated in vacuo and the residue triturated with water and afterwards with anhydrous ethyl ether. The product was dissolved in dimethylformamide and precipitated again by addition of anhydrous ethyl ether, washed twice with ether and dried in vacuo.

Yield: 1.1 g.

EXAMPLE 35

*L - glutaminyl - L - prolyl - L - seryl - L - lysyl-L-aspartyl-L - alanyl - L - phenylalanyl - L - isoleucyl - glycyl - L-methioninamide* (II)

1.1 g. of N - carbobenzoxy - L - glutaminyl-L-prolyl-L-seryl - ε - N-carbobenzoxy - L - lysyl - L - aspartyl - L-alanyl - L - phenylalanyl - L - isoleucyl - glycyl - L-leucyl-L-methioninamide, as prepared in Example 34, were dissolved in 11 cc. of trifluoroacetic acid and then 4.7 cc. of methyl-ethyl sulfide were added. The solution was saturated with gaseous hydrogen bromide and kept at room temperature for 6 hours. The solvent was evaporated off in vacuo, the residue triturated with anhydrous ether and dried in vacuo over potassium hydroxide and phosphorus pentoxide. The crude product thus obtained was purified by countercurrent distribution: 200 transfers in n-butanol/0.5 N aqueous acetic acid. The fractions contained in tubes 55–70 showed the highest biological activity.

The product isolated yielded on acidic hydrolysis (16 hours at 11° C. in 6 N hydrochloric acid) the following aminoacids: glutamic acid, proline, serine, lysine, aspartic acid, alanine, phenylalanine, isoleucine, leucine, glycine and methionine.

30 g. of undecapeptide were further purified by chromatography on 3 M/M Whatman paper employing an n-butanol/acetic acid/water (4:1:5) mixture. The product thus obtained (10 mg.) appeared unitary both by chromatography and by electrophoresis. It also yielded the above eleven aminoacids on acid hydrolysis.

I claim:
1. L-alanyl-L-phenylalanyl-L-isoleucyl-glycyl-L-leucyl-L-methioninamide.
2. Carbobenzoxy-L-alanyl-L-phenylalanyl-L-isoleucyl-glycyl-L-leucyl-L-methioninamide.

References Cited

UNITED STATES PATENTS

| | | | |
|---|---|---|---|
| 2,994,692 | 8/1961 | Amiard et al. | 260—112 |
| 3,067,101 | 12/1962 | Easton et al. | 167—65 |
| 3,089,819 | 5/1963 | Short | 167—65 |
| 3,095,408 | 6/1963 | Anderson et al. | 260—112 |
| 3,268,502 | 8/1966 | Lubke et al. | 260—112.5 |
| 3,272,790 | 8/1966 | Bernardi et al. | 260—112.5 |
| 3,299,035 | 1/1967 | Boissonnas et al. | 260—112.5 |
| 3,300,469 | 11/1967 | Bernardi et al. | 260—112.5 |
| 3,309,353 | 3/1967 | Boissonnas et al. | 260—112.5 |

OTHER REFERENCES

Dekker et al.: J. Biological Chem., 181, 719–729 (1949).

Fruton: Ad in Protein Che. 5, 1–82 (1949).

Goodman et al.: Adv. in Protein Che. 12, 465–638 (1957).

Rudinger et al.: Coll. Czech. Chem. Comm., 23, 1947–1957 (1958).

Schroder and Lübke: The Peptides, vol. II, Academic Press, New York, 1966, pp. 127–153.

LEWIS GOTTS, *Primary Examiner.*

JULIAN S. LEVITT, LEON J. BERCOVITZ, ELBERT L. ROBERTS, *Examiners.*

E. FRANK, M. J. WELSH, M. M. KASSENOFF,
*Assistant Examiners.*